United States Patent
Zhao et al.

(10) Patent No.: US 9,318,960 B2
(45) Date of Patent: Apr. 19, 2016

(54) HIGH EFFICIENCY AND LOW LOSS AC-DC POWER SUPPLY CIRCUIT AND CONTROL METHOD

(71) Applicant: Silergy Semiconductor Technology (Hangzhou) LTD, Hangzhou, ZheJiang Province (CN)

(72) Inventors: Chen Zhao, Hangzhou (CN); Jie Yao, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 187 days.

(21) Appl. No.: 13/937,498

(22) Filed: Jul. 9, 2013

(65) Prior Publication Data

US 2014/0043866 A1   Feb. 13, 2014

(30) Foreign Application Priority Data

Aug. 9, 2012   (CN) .......................... 2012 1 0282377

(51) Int. Cl.
| | |
|---|---|
| *H02M 5/42* | (2006.01) |
| *H02M 3/335* | (2006.01) |
| *H02M 1/42* | (2007.01) |
| *H02M 1/00* | (2007.01) |

(52) U.S. Cl.
CPC ........ *H02M 3/33507* (2013.01); *H02M 1/4225* (2013.01); *H02M 3/33523* (2013.01); *H02M 2001/007* (2013.01); *H02M 2001/0025* (2013.01); *Y02B 70/126* (2013.01)

(58) Field of Classification Search
CPC ...................... H02M 3/33507; H02M 3/33523; H02M 2001/007; H02M 2001/0067; H02M 2001/0074; H02M 2001/0077; H02M 2001/0025; H02M 1/4225; H02M 1/42
USPC .................. 363/21.1, 34, 81, 125, 109, 21.12
See application file for complete search history.

(56) References Cited

U.S. PATENT DOCUMENTS

| | | | |
|---|---|---|---|
| 6,344,986 B1 | 2/2002 | Jain | |
| 2008/0089100 A1* | 4/2008 | Park | ................. H02M 3/33523 363/21.01 |
| 2009/0251934 A1* | 10/2009 | Shteynberg et al. | ............ 363/81 |
| 2010/0033150 A1* | 2/2010 | Irissou | ................. H02M 3/158 323/284 |

FOREIGN PATENT DOCUMENTS

KR   100764387 B1   10/2007

* cited by examiner

*Primary Examiner* — Jessica Han
*Assistant Examiner* — Lorena Bruner
(74) *Attorney, Agent, or Firm* — Michael C. Stephens, Jr.

(57) ABSTRACT

Disclosed herein are high efficiency, low loss AC-DC power supply circuits, and associated control methods. In one embodiment, an AC-DC power supply circuit can include: (i) a rectifier configured to rectify an AC power supply to generate a DC input voltage; (ii) a first stage voltage converter configured to convert the DC input voltage to a first output voltage, and to convert a first control signal to a feedback signal that represents the first output voltage; and (iii) a second stage voltage converter configured to convert the first output voltage to a constant DC output signal, where the first control signal represents a duty cycle of the second stage voltage converter.

16 Claims, 6 Drawing Sheets

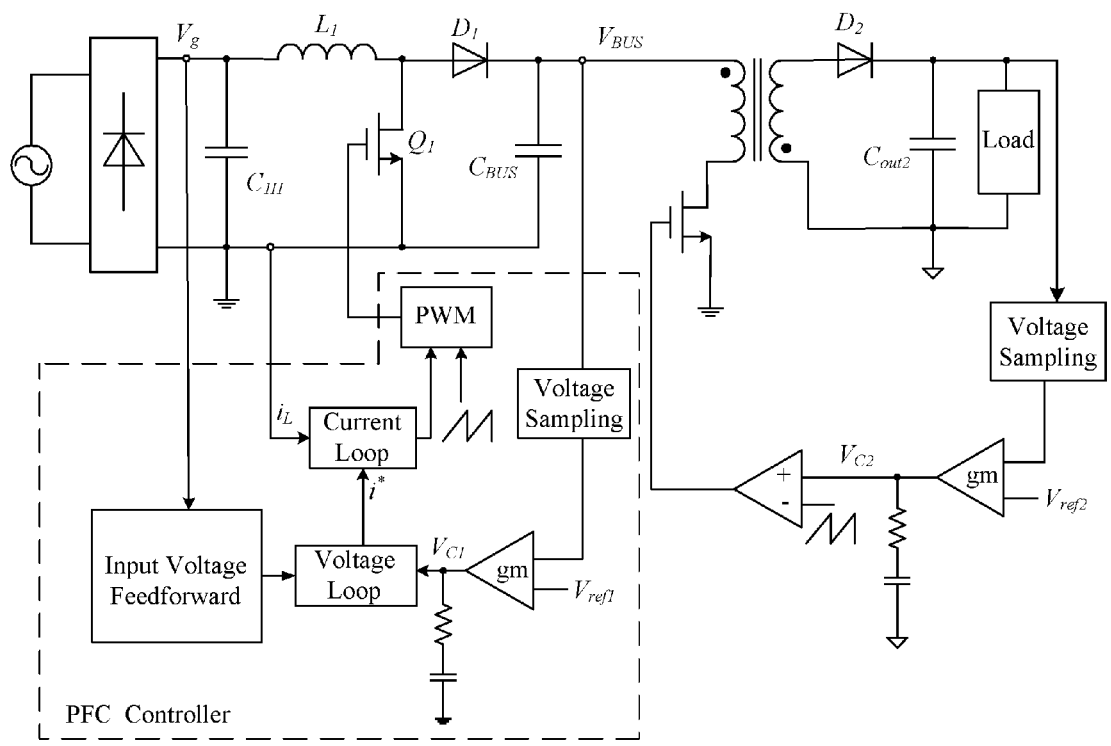
FIG. 1 (conventional)

HIGH EFFICIENCY AND LOW LOSS AC-DC POWER SUPPLY CIRCUIT AND CONTROL METHOD

RELATED APPLICATIONS

This application claims the benefit of Chinese Patent Application No. 201210282377.1, filed on Aug. 9, 2012, which is incorporated herein by reference in its entirety.

FIELD OF THE INVENTION

The present invention relates to the field of switching mode power supplies, and more specifically to high efficiency and low loss AC-DC power supply circuit and control method.

BACKGROUND

FIG. 1 shows a conventional AC-DC power supply circuit. An AC power supply can be converted to DC input voltage $V_g$ through a rectifier bridge and a filter capacitor, and then DC input voltage $V_g$ can be converted to a DC voltage through a boost circuit and a flyback converter. The boost circuit may have a power factor correction (PFC) function. A PFC controller can receive DC input voltage $V_g$ and bus voltage $V_B$ to generate current reference I*, and a current loop controller can control the switching operation of switch $Q_1$ according to current reference I* and detected input current. The DC input voltage $V_g$ may be converted to bus voltage $V_B$, and the input current can be maintained in a same phase with the input voltage, thus improving the circuit power factor.

SUMMARY

In one embodiment, an AC-DC power supply circuit can include: (i) a rectifier configured to rectify an AC power supply to generate a DC input voltage; (ii) a first stage voltage converter configured to convert the DC input voltage to a first output voltage, and to convert a first control signal to a feedback signal that represents the first output voltage; and (iii) a second stage voltage converter configured to convert the first output voltage to a constant DC output signal, where the first control signal represents a duty cycle of the second stage voltage converter.

In one embodiment, a control method for an AC-DC power supply circuit, can include: (i) rectifying an AC power supply to generate a DC input voltage; (ii) converting the DC input voltage to a first output voltage through a first stage voltage converter; (iii) converting the first output voltage to a constant DC output signal through a second voltage converter; and (iv) converting a first control signal to a feedback signal that represents the first output voltage, where the first control signal represents a duty cycle of the second stage voltage converter.

Embodiments of the present invention can advantageously provide several advantages over conventional approaches. For example, standby efficiency can be improved, and the bus voltage may be lowered to reduce power losses under light-load conditions. Other advantages of the present invention may become readily apparent from the detailed description of preferred embodiments below.

BRIEF DESCRIPTION OF THE DRAWINGS

FIG. 1 is a block diagram of a conventional AC-DC power supply circuit.

DETAILED DESCRIPTION

Figure 2:
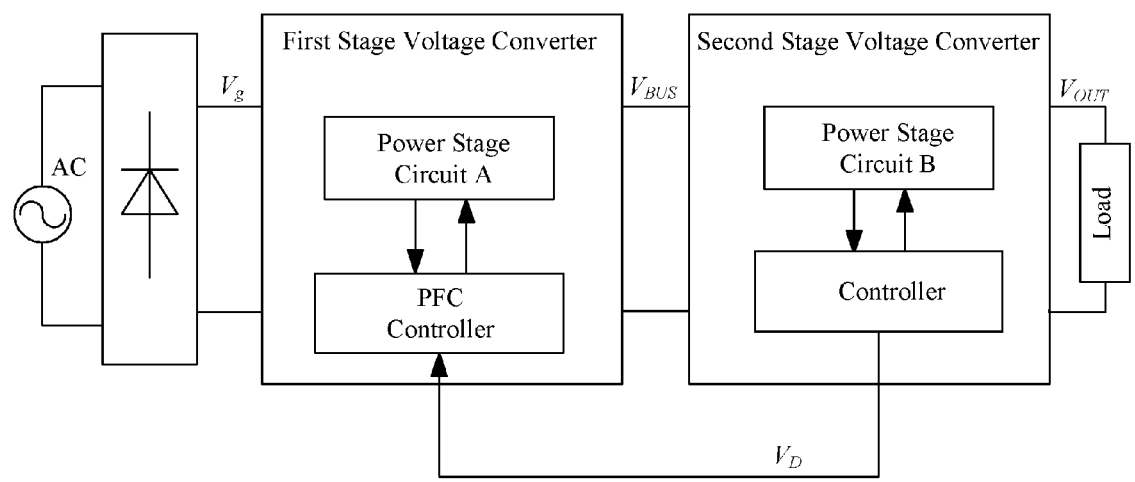
FIG. 2 is a block diagram of a first example AC-DC power supply circuit in accordance with embodiments of the present invention.

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set fourth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

There are several drawbacks associated with conventional AC-DC power supply circuits, such as that shown in FIG. 1. Typically, dividing resistors are used to sample bus voltage $V_B$, and the output voltage of a normal boost circuit may be from about 300V to about 400V. For example, if bus voltage $V_B$ is 400V and sampling resistor is 2 MΩ, power losses on the sampling resistor can be 80 mW. However, total standby loss of a prototype including the standby loss of control chips in all stage circuits, and power loss of external components, usually should be lower than about 0.3 W. Power losses on the sampling resistors from using sampling resistors to obtain the output voltage information of the boost circuit may occupy a large part of the overall standby loss. Thus, standby efficiency may be reduced along with increased design difficulty.

Under light-load conditions, bus voltage $V_B$ may remain substantially constant, while the duty cycle of the latter flyback converter may be reduced such that the flyback converter operates in a discontinuous current mood (DCM). This operation may maintain the DC output voltage as substantially stable. Therefore, switching losses in the former stage circuit when bus voltage $V_B$ is relatively high may cause energy losses that essentially prevent improvement of supply conversion efficiency.

In particular embodiments, a low loss AC-DC power supply circuit and control method can reduce the energy losses of conventional approaches caused by consuming power on sampling resistors under high bus voltage conditions and relatively large switching losses under light-load condition in particular embodiments, an AC-DC power supply circuit can use duty cycle information of the latter stage voltage converter to represent an output voltage of the former stage voltage converter. In this approach, sampling resistors may not be needed to detect the output voltage of the first stage voltage converter. Thus, standby efficiency can be improved, and the design may be facilitated. Further, the bus voltage may be lowered to reduce power losses under light-load conditions.

In one embodiment, an AC-DC power supply circuit can include: (i) a rectifier configured to rectify an AC power supply to generate a DC input voltage; (ii) a first stage voltage converter configured to convert the DC input voltage to a first output voltage, and to convert a first control signal to a feedback signal that represents the first output voltage; and (iii) a second stage voltage converter configured to convert the first output voltage to a constant DC output signal, where the first control signal represents a duty cycle of the second stage voltage converter. For example, the AC-DC power supply circuit may be implemented without sampling resistors.

Referring now to FIG. 2, shown is a block diagram of an example AC-DC power supply circuit in accordance with embodiments of the present invention. In this example, the AC-DC power supply circuit can convert DC input voltage $V_g$ that is obtained by rectifying the AC power supply to DC output signal $V_{OUT}$ through a first stage voltage converter and a second stage voltage converter, so as to supply power for a load.

The first stage voltage converter can convert DC input voltage $V_g$ to output voltage $V_{BUS}$. The second stage voltage converter can convert output voltage $V_{BUS}$ to constant DC output signal $V_{OUT}$ by controlling the power stage circuit through a controller. Also, the second stage voltage converter can output control signal $V_D$ that represents a duty cycle of the second stage voltage converter. For example, a switching control signal output by the controller in the second stage voltage converter can be configured as control signal $V_D$.

A power factor correction (PFC) controller in the first stage voltage converter can convert control signal $V_D$ to a feedback signal that represents output voltage $V_{BUS}$ of the first stage voltage converter. In this way, output voltage $V_{BUS}$ can be detected without use of a sampling circuit or sampling resistors. Also, the PFC controller in the first stage voltage converter can convert DC input voltage $V_g$ to output voltage $V_{BUS}$ by controlling a switch in power stage circuit A according to the feedback signal. In addition, the PFC converter can also realize power factor correction.

Therefore, as the output voltage of the former stage circuit (e.g., first stage voltage converter) can be characterized by the duty cycle information of the latter stage circuit (e.g., second stage voltage converter), the AC-DC power supply of particular embodiments can detect the output voltage of the first stage voltage converter without sampling resistors. Accordingly, the problem found in conventional approaches of consuming too much power on the sampling resistors under high bus voltage conditions can be solved, and the standby efficiency can be increased.

Figure 3:
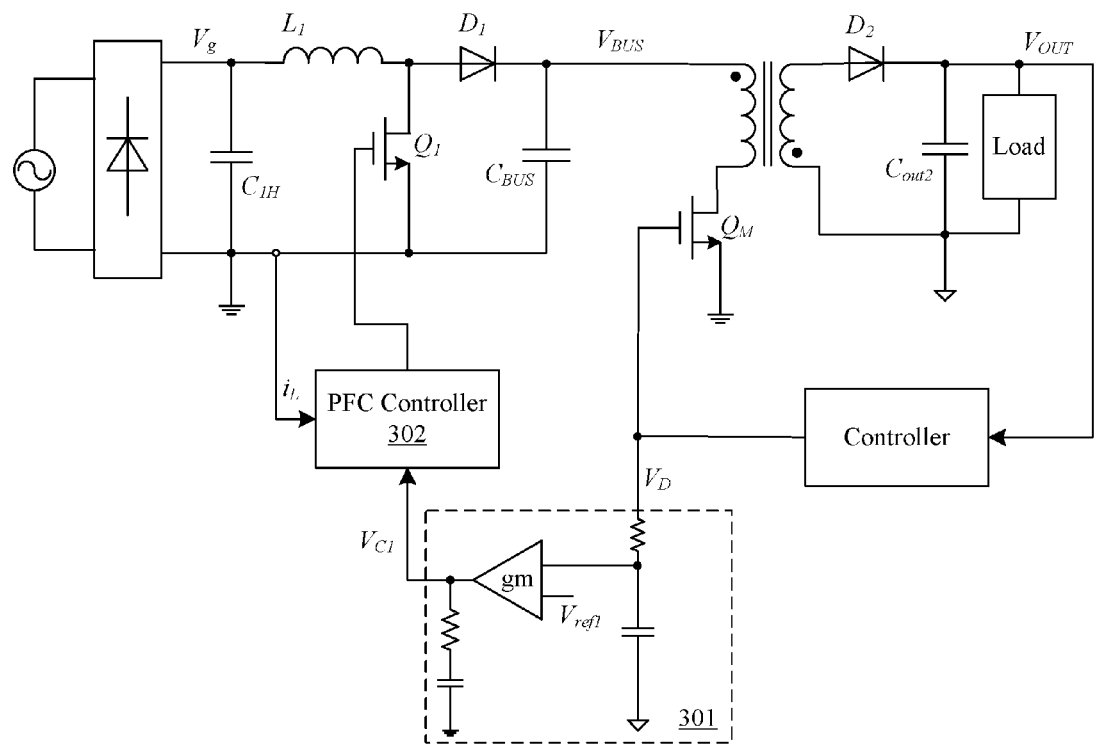
FIG. 3 is a block diagram of a second example AC-DC power supply circuit in accordance with embodiments of the present invention.

Referring now to FIG. 3, shown is a block diagram of a second example AC-DC power supply circuit in accordance with embodiments of the present invention. In this example, implementations of the power stage circuit in the first and second converters, and the control circuit are based on the particular example shown in FIG. 2. In this example of FIG. 3, the first stage voltage converter can be a non-isolated boost circuit including inductor $L_1$, switch $Q_1$, diode $D_1$, and output capacitor $C_{BUS}$, and the second stage voltage converter can be a flyback converter.

Duty cycle $D_y$ of the flyback converter can be calculated as below in the formula (1):

$$\frac{V_{OUT}}{V_{BUS}} = \frac{1}{N} \times \frac{D_y}{1-D_y} \qquad (1)$$

N can denote the turns ratio of primary and secondary windings of the flyback converter. For example, when N=1, then formula (2) can be obtained:

$$1 + \frac{V_{OUT}}{V_{BUS}} = \frac{1}{1-D_y} \qquad (2)$$

It can be seen that, when DC output signal $V_{OUT}$ of the AC-DC power supply circuit is fixed, output voltage $V_{BUS}$ and duty cycle $D_y$ of the flyback converter are inversely proportional to each other. Thus, duty cycle $D_y$ of the flyback converter can be used to represent output voltage $V_{BUS}$ to replace sampling resistors used in conventional approaches.

The first stage voltage converter can also include output voltage feedback circuit 301 and PFC controller 302. Output voltage feedback circuit 301 can receive the switch control signal output by the controller in the second stage voltage converter as control signal $V_D$. An averaging resistor and an averaging capacitor that are connected in series to ground can be used to average control signal $V_D$. A voltage at the common junction of the averaging resistor and the averaging capacitor can be input to a transconductance operational amplifier to compare against reference $V_{ref1}$, and a comparison result can be used to obtain feedback signal $V_{C1}$ through a compensating circuit.

PFC controller 302 can receive feedback signal $V_{C1}$ and input current signal $i_L$ of the first stage voltage converter. PFC controller 302 may generate output voltage $V_{BUS}$ by controlling switch $Q_1$. In addition, input voltage (e.g., $V_g$) and input current of the first stage voltage converter may be controlled by PFC controller 302 to be in the same phase.

When output voltage $V_{BUS}$ is rising, duty cycle $D_y$ of the flyback converter may be decreasing. Correspondingly, the value obtained by averaging control signal $V_D$ can also be decreasing. Thus, feedback signal $V_{C1}$ may increase to control the decreasing of output voltage $V_{BUS}$. Therefore, under light-load conditions (e.g., a load that is less than a predetermined amount), the duty cycle of the second stage voltage converter may decrease to control output voltage $V_{BUS}$ decreasing accordingly. As a result, switching losses can be significantly reduced to improve efficiency of the entire circuit.

Topologies of the first and second stage voltage converters are not limited to the above described examples. For example, the first stage voltage converter can be any of other non-isolated topologies with power factor correction functions, and the second stage voltage converter can also be any other appropriate isolated topology. Similarly, while the first stage voltage converter is an isolated topology with power factor correction function, the second stage voltage converter can be a non-isolated topology. For example, isolated topologies can include flyback converter, forward converter, push-pull converter, bridge converter, and so on, and non-isolated topologies can include non-isolated buck circuit, non-isolated boost circuit, non-isolated boost-buck circuit, and so on.

Figure 4:
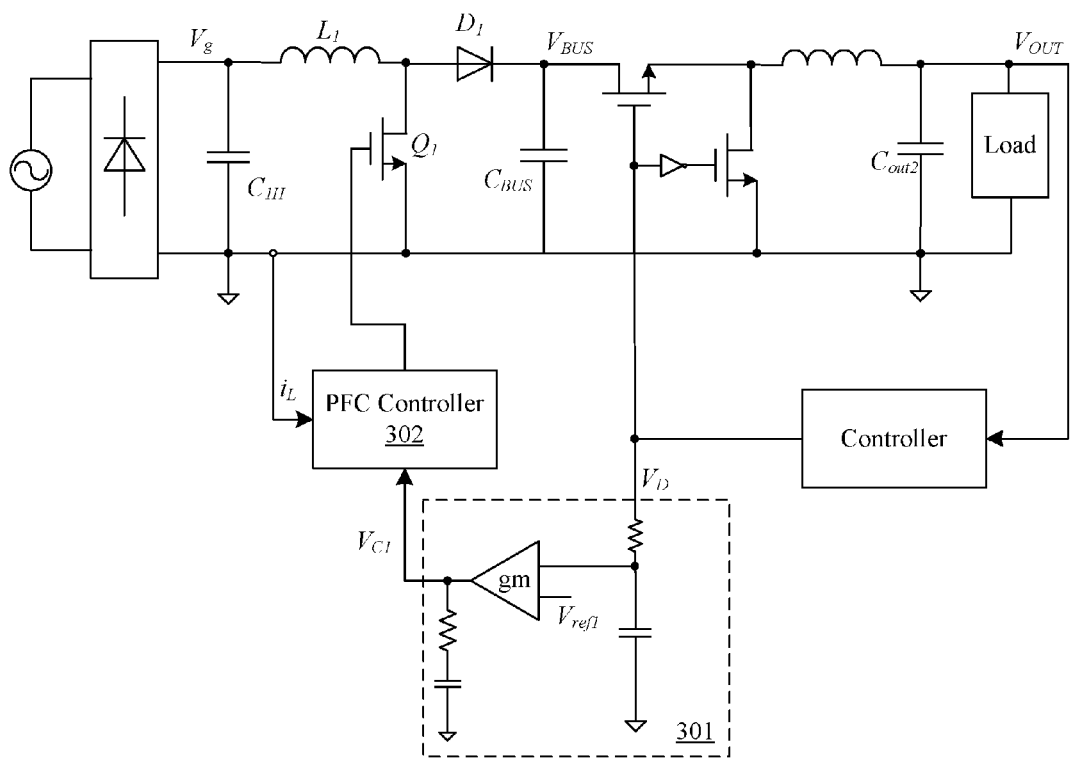
FIG. 4 is a block diagram of a third example AC-DC power supply circuit in accordance with embodiments of the present invention.

In addition, the two-stage voltage converter applying non-isolated topologies for both of the two stages can also be accommodated in particular embodiments. For example, as shown in FIG. 4, the first stage voltage converter can be a non-isolated boost circuit, and the second stage voltage converter can be a non-isolated buck circuit. When output voltage $V_{OUT}$ of the AC-DC power supply circuit is fixed, output voltage $V_{BUS}$ and duty cycle $D_y$ of the flyback converter can be inversely proportional to each other.

Figure 5:
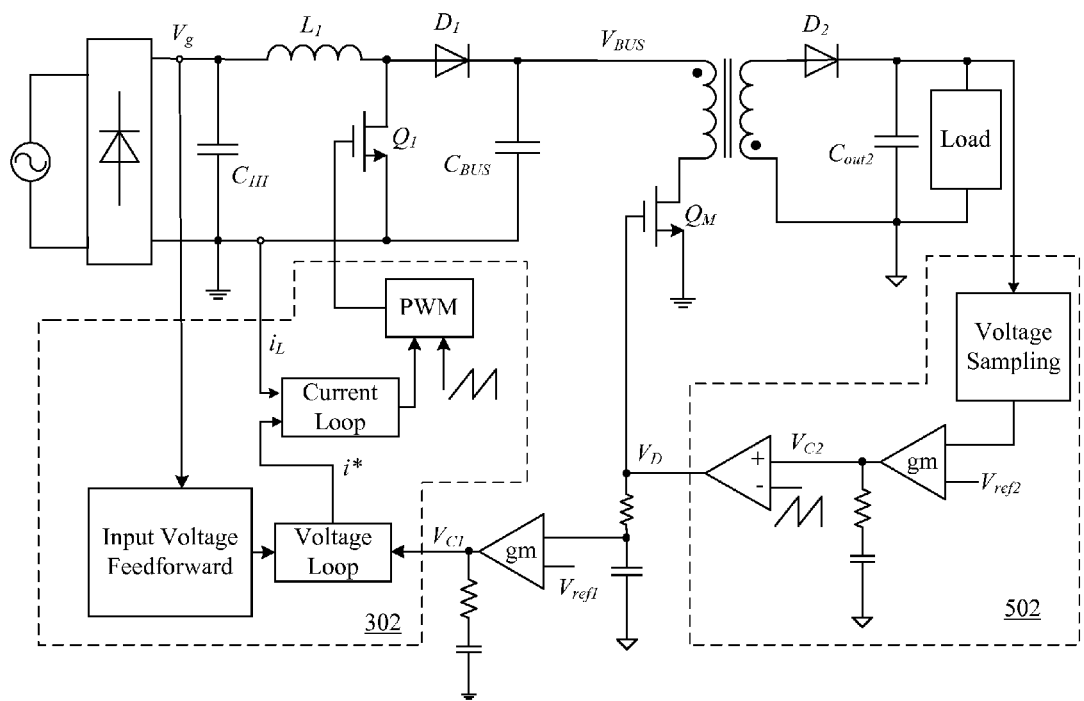
FIG. 5 is a block diagram of a fourth example AC-DC power supply circuit in accordance with embodiments of the present invention.

FIG. 5 shows example implementations of PFC controller 302 in the first stage voltage converter, and controller 502 in the second stage voltage converter. In this particular example, PFC controller 302 can operate in an input voltage feedforward control mode by sampling and feedforward of DC input voltage $V_g$. Alternatively, PFC controller 302 can operate in a constant conduction time mode to realize PFC control, but without input voltage feedforward.

In one embodiment, a control method for an AC-DC power supply circuit, can include: (i) rectifying an AC power supply to generate a DC input voltage; (ii) converting the DC input voltage to a first output voltage through a first stage voltage converter; (iii) converting the first output voltage to a constant DC output signal through a second voltage converter; and (iv) converting a first control signal to a feedback signal that represents the first output voltage, where the first control signal represents a duty cycle of the second stage voltage converter.

Figure 6:
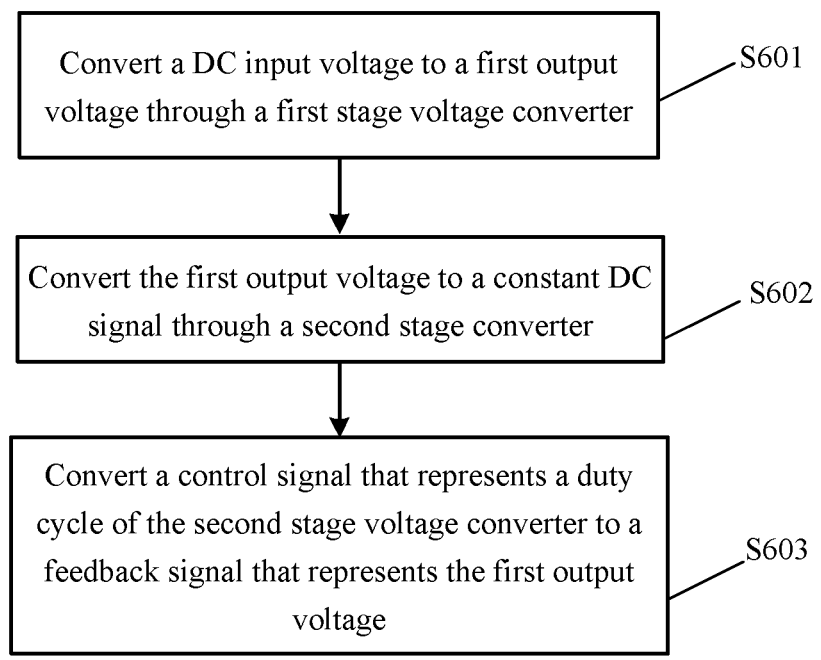
FIG. 6 is a block diagram of an example control method for an AC-DC power supply circuit in accordance with embodiments of the present invention.

Referring now to FIG. 6, shown is an example flow diagram of a control method for a high efficiency and low loss AC-DC power supply circuit, in accordance with embodiments of the present invention. This example method may be used for converting a DC input voltage that is obtained by rectifying an AC power supply to a DC output signal through first and second stage voltage converters.

At S601, a DC input voltage can be converted to a first output voltage by a first stage voltage converter. At S602, the first output voltage can be converted to a constant DC output signal through a second voltage converter. At S603, a control signal that represents a duty cycle of the second stage voltage converter can be converted to a feedback signal that represents the first output voltage. In this way, first stage voltage conversion can be accordingly realized.

Step S603 can also include averaging the first control signal, comparing the first control signal against a first reference value, and obtaining the feedback signal through compensation according to a comparison result. Step S603 can also include receiving the feedback signal and an input current signal of the first stage voltage converter, converting the DC input voltage to the first output voltage accordingly, and controlling the input voltage and the input current of the first stage voltage converter to be in a same phase. In this particular example, the first control signal can be configured as the switching control signal of the second voltage converter.

The embodiments were chosen and described in order to best explain the principles of the invention and its practical applications, to thereby enable others skilled in the art to best utilize the invention and various embodiments with modifications as are suited to the particular use contemplated. It is intended that the scope of the invention be defined by the claims appended hereto and their equivalents.

What is claimed is:

1. An AC-DC power supply circuit, comprising:
   a) a rectifier configured to rectify an AC power supply to generate a DC input voltage;
   b) a first stage voltage converter configured to convert said DC input voltage to a first stage output voltage, and to convert a control signal to a feedback signal that represents said first stage output voltage without using sampling resistors;
   c) a second stage voltage converter configured to convert said first stage output voltage to a constant DC output signal, and to generate said control signal that represents a duty cycle of said second stage voltage converter; and
   d) an output voltage feedback circuit in said first stage voltage converter and being configured to average said control signal, to compare said control signal against a reference value, and to generate said feedback signal via a compensation circuit to control a switch to convert said DC input voltage to said first stage output voltage.

2. The AC-DC power supply circuit of claim 1, wherein said first stage output voltage and said duty cycle represented by said control signal are inversely proportional to each other.

3. The AC-DC power supply circuit of claim 1, wherein said first stage voltage converter comprises
   b) a power factor correction (PFC) controller configured to receive said feedback signal and an input current signal of said first stage voltage converter, and to convert said DC input voltage to said first stage output voltage, wherein said DC input voltage and said input current signal are in a same phase.

4. The AC-DC power supply circuit of claim 3, wherein said PFC controller is configured to operate in a constant conduction time mode.

5. The AC-DC power supply circuit of claim 3, wherein said PFC controller is configured to operate in an input voltage feedforward control mode.

6. The AC-DC power supply circuit of claim 3, wherein said first stage voltage converter comprises a first power switch, and said second stage voltage converter comprises a second power switch.

7. The AC-DC power supply circuit of claim 6, wherein said first power switch is controlled by an output from said PFC controller.

8. The AC-DC power supply circuit of claim 6, wherein said second power switch is controlled by said control signal.

9. The AC-DC power supply circuit of claim 1, wherein said control signal comprises a switching control signal of said second stage voltage converter.

10. The AC-DC power supply circuit of claim 1, wherein said output voltage feedback circuit comprises a transconductance amplifier configured to receive said reference value.

11. The AC-DC power supply circuit of claim 1, wherein said first stage voltage converter comprises an inductor that is directly connected to said DC input voltage.

12. The AC-DC power supply circuit of claim 1, wherein said duty cycle of said second stage voltage converter is configured to decrease under light-load conditions.

13. The AC-DC power supply circuit of claim 1, wherein said first stage voltage converter comprises a non-isolated topology, and said second stage voltage converter comprises an isolated topology.

14. A method of controlling an AC-DC power supply circuit, the method comprising:
   a) rectifying an AC power supply to generate a DC input voltage;
   b) converting said DC input voltage to a first stage output voltage through a first stage voltage converter;
   c) converting said first stage output voltage to a constant DC output signal, and generating said control signal, through a second voltage converter;
   d) converting, without using sampling resistors, a control signal to a feedback signal that represents said first stage output voltage, wherein said control signal represents a duty cycle of said second stage voltage converter; and e) averaging said control signal, comparing said control signal against a reference value, and generating said feedback signal through compensation to control a switch for converting said DC input voltage to said first stage output voltage.

15. The method of claim 14, further comprising b) receiving said feedback signal and an input current signal of said first stage voltage converter, converting said DC input voltage to said first stage output voltage according to said input current signal and said feedback signal, and controlling said DC input voltage and said input current signal to be in a same phase.

16. The method of claim 14, wherein said control signal comprises a switching control signal of said second stage voltage converter.

* * * * *